US009987761B2

(12) United States Patent
Blei et al.

(10) Patent No.: US 9,987,761 B2
(45) Date of Patent: Jun. 5, 2018

(54) DEVICE AND METHOD FOR CUTTING OFF AN END SECTION OF A CAN BLANK

(75) Inventors: Klaus Blei, Wangen (DE); Uwe Gunther, Goppingen (DE)

(73) Assignee: SCHULER PRESSEN GMBH, Goppingen (DE)

( * ) Notice: Subject to any disclaimer, the term of this patent is extended or adjusted under 35 U.S.C. 154(b) by 1208 days.

(21) Appl. No.: 14/005,057

(22) PCT Filed: Mar. 23, 2012

(86) PCT No.: PCT/EP2012/055187
§ 371 (c)(1),
(2), (4) Date: Aug. 6, 2014

(87) PCT Pub. No.: WO2012/127026
PCT Pub. Date: Sep. 27, 2012

(65) Prior Publication Data
US 2014/0346154 A1    Nov. 27, 2014

(30) Foreign Application Priority Data
Mar. 24, 2011   (DE) .................. 10 2011 001 521

(51) Int. Cl.
| B26D 7/06 | (2006.01) |
| B21D 51/26 | (2006.01) |
| B23D 31/00 | (2006.01) |
| B26D 3/16 | (2006.01) |
| B26D 7/01 | (2006.01) |
| B23K 26/38 | (2014.01) |
| B65G 47/84 | (2006.01) |

(52) U.S. Cl.
CPC ........... *B26D 7/0625* (2013.01); *B21D 51/26* (2013.01); *B23D 31/001* (2013.01); *B23K 26/38* (2013.01); *B26D 3/166* (2013.01); *B26D 7/01* (2013.01); *B65G 47/846* (2013.01); *Y10T 83/4734* (2015.04)

(58) Field of Classification Search
CPC ....... B65G 47/846; B23D 31/001; B26D 7/01
See application file for complete search history.

(56) References Cited

U.S. PATENT DOCUMENTS

| 2,602,533 A | * | 7/1952 | Bruce | .................... B65G 47/71 |
| | | | | 198/441 |
| 2,701,015 A | * | 2/1955 | Gottschalk | .............. B29C 37/02 |
| | | | | 74/422 |

(Continued)

FOREIGN PATENT DOCUMENTS

FR   2298395 A1   8/1976

*Primary Examiner* — Sean Michalski
(74) *Attorney, Agent, or Firm* — R. S. Lombard (57) ABSTRACT

The invention is to a device and method, for cutting a can blank in which case an end section of the can blank is severed. The can blank is moved by means of a conveyor arrangement at a constant speed about a first axis of rotation. Preferably, a laser beam is used as the cutting means. A deflecting arrangement deflects the laser beam to a focal point where the side surface of the can blank is located. Due to the rotation of the can blank about its longitudinal axis, the axial end section of said can blank is severed. The focal point of the laser beam does not change relative to the longitudinal axis of the can blank during the laser cutting operation.

14 Claims, 4 Drawing Sheets

(56) References Cited

U.S. PATENT DOCUMENTS

| | | | | |
|---|---|---|---|---|
| 2,787,359 A * | 4/1957 | Gerecke | ............... | B65B 35/46 198/441 |
| 3,130,698 A * | 4/1964 | Knowles | ............. | B23D 31/001 72/338 |
| 3,400,620 A * | 9/1968 | Armbruster | ......... | B23D 31/001 82/101 |
| 3,481,233 A * | 12/1969 | Paskey | ................. | B23D 67/00 409/165 |
| 3,488,994 A * | 1/1970 | Riddell | ................... | B07C 5/07 209/561 |
| 3,565,034 A * | 2/1971 | Birchall | ................. | B41F 17/22 118/219 |
| 3,687,285 A * | 8/1972 | Messervey | ......... | G01M 3/3209 198/370.05 |
| 3,756,103 A * | 9/1973 | Cvacho | ................. | B23D 21/14 82/101 |
| 3,800,638 A * | 4/1974 | Duikers | .................. | B29C 49/74 82/101 |
| 3,818,785 A | 6/1974 | Wakabayashi | | |
| 3,916,746 A * | 11/1975 | Stroobants | .......... | B23D 31/001 82/54 |
| 3,967,516 A * | 7/1976 | Griesing | ................. | B23Q 7/02 82/101 |
| 3,975,260 A * | 8/1976 | Peyton | ................... | B07C 5/122 198/441 |
| 4,014,228 A * | 3/1977 | Dean | .................... | B23D 31/001 82/101 |
| 4,030,432 A * | 6/1977 | Miller | .................. | B23D 31/001 413/69 |
| 4,148,402 A * | 4/1979 | Atkinson | ............ | B23D 31/001 414/676 |
| 4,467,908 A * | 8/1984 | Schneider | .............. | B65G 47/71 198/441 |
| 4,596,107 A * | 6/1986 | Pfleger, Sr. | ........... | B07C 5/3408 198/370.03 |
| 4,694,633 A * | 9/1987 | Fujio | ...................... | B65B 21/26 156/215 |
| 4,729,811 A * | 3/1988 | DiFrank | .................... | B65C 9/34 156/449 |
| 5,439,095 A * | 8/1995 | Lentz | .................. | B65G 47/846 198/480.1 |
| 5,464,495 A * | 11/1995 | Eder | ......................... | B65C 3/16 156/446 |
| 5,590,753 A * | 1/1997 | Bertschi | ............... | B65G 47/847 198/441 |
| 5,694,822 A * | 12/1997 | Maidment | ........... | B23D 31/001 83/114 |
| 5,785,803 A * | 7/1998 | Schiessl | .................. | B65C 9/045 156/456 |
| 7,261,199 B2 * | 8/2007 | Hartness | ................ | B67C 3/225 198/470.1 |
| 7,310,983 B2 * | 12/2007 | Schill | ................ | B21D 51/2615 198/473.1 |
| 8,402,721 B2 * | 3/2013 | Kramer | ................ | B05C 1/0817 118/261 |
| 8,499,921 B1 * | 8/2013 | Orndorff | ............ | B65G 21/2072 198/479.1 |
| 8,556,062 B2 * | 10/2013 | Stoiber | ................ | B65G 47/847 198/470.1 |
| 8,561,783 B2 * | 10/2013 | McAllister | ........... | B65G 47/846 198/473.1 |
| 8,657,101 B2 * | 2/2014 | Zoni | ...................... | B65G 29/00 198/459.2 |
| 9,415,951 B2 * | 8/2016 | Fahldieck | ............... | B08B 9/426 |
| 2003/0116222 A1 * | 6/2003 | Spatafora | ............ | B65G 47/848 141/237 |
| 2004/0011169 A1 * | 1/2004 | Marshall | ................ | B26D 3/166 83/13 |

\* cited by examiner

DEVICE AND METHOD FOR CUTTING OFF AN END SECTION OF A CAN BLANK

CROSS REFERENCE TO RELATED APPLICATION

The present patent application is based upon and claims the benefit of German patent application no. 10 2011 001 521.3, filed on Mar. 24, 2011; and PCT application no.: PCT/EP2012/055187, filed Mar. 23, 2012.

BACKGROUND OF THE INVENTION

The invention relates to a method, as well as to a device, for laser cutting a can blank. In particular, the device and the method are to be used for cutting off the axial end section of a can blank. The can blank has a side surface and a can bottom. Depending on the process by means of which this can blank is being manufactured, the edge may be uneven or jagged. In these cases it is necessary that the axial end section of the can blank be severed with the use of a cutting means. The cutting means may be a laser beam or a mechanical cutting tool.

A method for the manufacture of a metal can has been known from publication DE 28 01 475. It suggests the removal of the axial end section by laser cutting. In doing so, the can blank is held, via a magnetic or vacuum unit, by a holding arrangement comprising a rotatable plate. A plurality of holding arrangements is arranged on a rotary table of a conveyor arrangement. Next to the rotary table, there is arranged a laser that is capable of severing the axial end section of a can blank.

A method and a device for the manufacture of can blanks, as well as cans, has been known from publication DE 10 2009 003 699 A1. In this case, plastic cans are made of so-called integral precursors by stretch blow molding. A laser cutting unit is used for cutting; however, it is not described in detail.

Considering this prior art, the provision of a device for cutting can blanks can be viewed as the object of the present invention, said device permitting an efficient machining of the can blank and being simple in design. In addition, a simple and economical method for cutting can blanks is to be disclosed.

This object is achieved with a device as well as a method displaying the features of the claims.

SUMMARY OF THE INVENTION

In accordance with the present invention, the device for cutting a can blank comprises a first conveyor arrangement comprising several can receptacles, said conveyor arrangement rotating about a first axis of rotation. Each can receptacle is disposed to accommodate one can blank. The can blank is positioned and held in the can receptacle by means of a holding arrangement. The holding arrangement comprises a plate that can be rotated about a second axis of rotation, in which case the second axis of rotation coincides, in particular, with the longitudinal axis of the can blank. A cutting means moves so as to be adapted to the movement of the conveyor arrangement and, in particular, to the rotational speed of the can receptacle about the first axis of rotation. During the cutting operation, the affected can blank can thus be moved about the first axis of rotation, as well as about the second axis of rotation. Because any stopping or delay of the conveyor arrangement during the cutting operation is not required, machining of a large number of can blanks per unit of time is possible. In a first exemplary embodiment of the device, the conveyor arrangement rotates at 210 revolutions per minute and comprises ten can receptacles. In this manner, it is possible to process 2100 cans per minute. The duration of contact of the cutting means with the can blank is very short and preferably less than 100 milliseconds, for example 15 to 50 milliseconds.

A mechanical cutting tool having a diamond or ceramic cutting edge may be used as the cutting means. In one region of the angle of rotation of the conveyor arrangement about the first axis of rotation, the cutting edge is brought into contact with the side surface of the can blank. To accomplish this, the cutting tool can be arranged on the conveyor arrangement so that said cutting tool can be shifted radially or diagonally relative to the first axis of rotation. Preferably, each can receptacle is allocated one separate cutting tool.

Alternatively, it is also possible to use a laser beam as the cutting means. A laser source for generating the laser beam is stationarily mounted to a machine frame, so that the conveyor arrangement and the can blanks will move relative to the laser source. For example, a solid state laser and, preferably, a fiber laser can be used as the laser source. The laser beam may be emitted as a continuous beam during the duration of contact. The device comprises a deflecting arrangement that is arranged between the laser source and a machining region and deflects the laser beam to the can blank in the machining region. To accomplish this, for example, the deflecting arrangement may have at least one reflecting surface. In doing so, the deflection of the laser beam is adapted to the rotational movement of the conveyor arrangement or the can blank about the first axis of rotation. The location of the focus of the laser beam remains unchanged relative to the first and/or second axes of rotation while the can blank is being machined. Due to the deflection that is adapted to the movement of the can blank about the first axis of rotation and due to the rotation of the blank can about its longitudinal axis, the can blank can be machined along is entire circumference, without requiring a change of the location of the focus. At the same time, the conveyor arrangement rotates continuously about the first axis of rotation.

In order to adjust the focal location of the laser beam on the side surface of the can blank relative to the can bottom, it is possible to support the deflecting arrangement so as to be movable parallel to the first axis of rotation and/or to the second axis of rotation. As a result of this, it is possible to machine can blanks having different heights in the same device.

Referring to the exemplary embodiment, the deflecting arrangement has several reflecting surfaces. In doing so, the deflecting arrangement can rotate about the first axis of rotation at the same speed as the conveyor arrangement and, in particular, be non-rotatably connected with the first conveyor arrangement. Considering this embodiment, it is advantageous for the number of reflecting surfaces to coincide with the number of can receptacles. In doing so, each can receptacle is allocated a reflecting surface by way of which the laser beam can be directed at the can blank located there. Viewed in peripheral direction about the first axis of rotation, the reflecting surfaces are not plane but, preferably, spherically convex, because they move relative to the incident laser beam coming from the laser source, and the focal point of the deflected reflected laser beam must also be guided unchanged relative to the second axis of rotation during the entire cutting operation.

In a preferred embodiment, the holding arrangement comprises a holding element that can be moved between an inoperative position and a holding position. In the inoperative position, the holding element clears the can receptacle, so that a can blank can be accepted or released. In the holding position, the holding element secures and supports the can blank in the can receptacle. To accomplish this, a part of the holding element can support the can blank on its side surface, so that an exact positioning of the can blank is ensured for laser cutting.

In order to support the can blank, the holding element may comprise, for example, an arcuate or annular support element. In the holding position, this support part may partially or fully enclose the side surface of the can blank in peripheral direction. In conjunction with this, it is particularly advantageous if the support part has an air bearing on its inside. As a result of this, the can blank can be precisely positioned. In addition, damage by scratching or even deformations are prevented.

For shifting the holding part between the inoperative position and the holding position, the device may comprise a cam rail in a preferred exemplary embodiment. In this case, a cam follower that is mechanically connected to the holding part may abut against the cam rail. The cam follower follows the cam rail during the rotation of the conveyor arrangement about the first axis of rotation and can thus achieve a shift of the holding part as a function of the progress of the cam rail. The position of the holding part or the shifting of the holding part is adapted to the position of rotation or rotation of the conveyor arrangement about the first axis of rotation. In this way, it is possible to very simply adapt the position or movement of the holding part to the rotation of the conveyor arrangement about the first axis of rotation and thus define the segments of rotations in which a can blank is being supported or released.

The plate may be continuously driven or, alternatively, stop, when the can blank is received into the can receptacle and/or is released from the can receptacle. When, as is the case in one embodiment, the plate is non-rotatably connected with a drive wheel, the rotation of the can blank about its longitudinal axis can be achieved very simply by rotation of the drive wheel. In order to achieve a rotation of the drive wheel, for example, an arcuate drive rail can be provided coaxially with respect to the first axis of rotation. When the drive wheel comes into contact with the inside of the arc of the drive rail, said wheel rolls off on this side and causes a rotation of the plate about the second axis of rotation. Preferably, the length of the arc-internal side of the drive rail is greater than the circumference of the drive wheel, so that the plate or the can blank performs more than one complete rotation about the second axis of rotation while the drive wheel abuts against the contact rail. This ensures that there is sufficient time available for completely cutting off an axial end section of the can blank. Furthermore, it is possible, in a simple manner, to stop the plate while it receives and/or releases a can blank.

Other objects and advantages of the present invention will become apparent to those skilled in the art upon a review of the following detailed description of the preferred embodiments and the accompanying drawings.

DETAILED DESCRIPTION OF THE INVENTION

Figure 1:
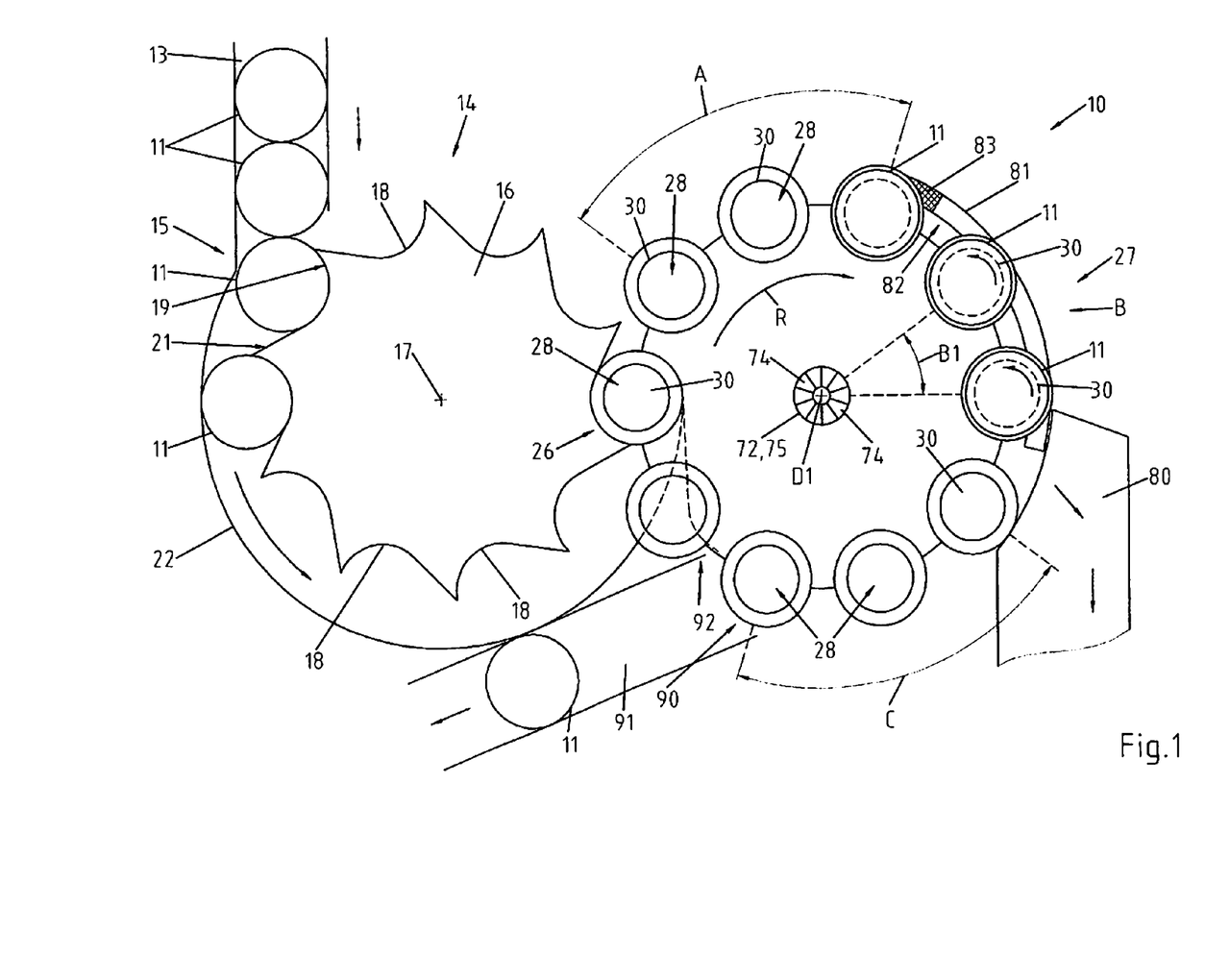
FIG. 1 is a schematic plan view of an exemplary embodiment of the device for cutting can blanks with the use of a laser.
Figure 2:
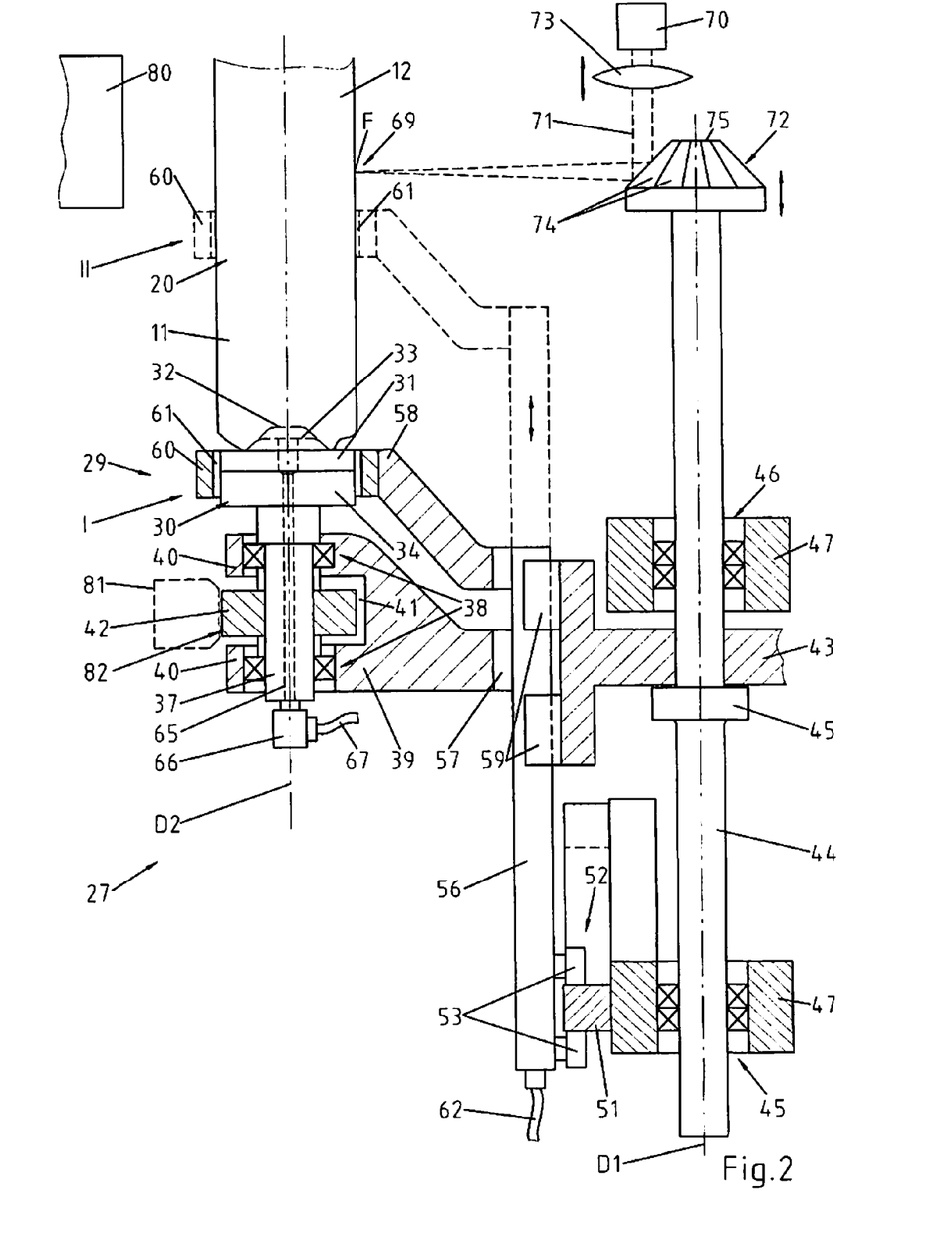
FIG. 2 is a schematic sectional view of a detail of an exemplary embodiment of a conveyor arrangement of the device as in FIG. 1.

FIGS. 1 and 2 show a device 10 for cutting can blanks 11 by means of a laser and, in particular, for cutting off an axial end section 12 of the can blank 11.

Via a supply channel 13, can blanks 11 are fed to a separating arrangement 14 that sequentially accepts the can blanks 11 at a receiving location 15 and continues to transport them at a distance from each other. To accomplish this, the separating arrangement 14 comprises a transport wheel 16 that is supported so as to be rotatable about a transport wheel axis of rotation 17. In the exemplary embodiment, the transport wheel 16 rotates in counterclockwise direction. On its outside periphery, the transport wheel has several, for example ten, transport recesses 18 at regular distances, each of said transport recesses being disposed for transporting one can blank 11. The transport wheel recesses 18 have a first recess section 19 that, preferably, has the form of circular arc, the progress of said circular arc in the preferred exemplary embodiment being adapted to the diameter of the side surface 20 of the can blank 11. The first recess section 19 is adjoined by a flat second recess section 21 that extends tangentially to the first recess section 19.

A guide element 22 is arranged coaxially with respect to the transport wheel 16, said guide element having a guide surface along which the can blanks 11 will slide during the rotation of the transport wheel 16. The distance of the guide element 22 from the transport wheel recesses 18 or the transport wheel axis of rotation 17 is adapted to the diameter of the side surface 20 of the can blanks 11.

It is understood that, instead of a rotating separating arrangement 14, it is potentially also possible to provide a separating arrangement that, for example, configured as a screw conveyor, conveys the can blanks 11 in linear direction.

At a transfer point 26, the transported and separated can blanks 11 are transferred by the separating arrangement 14 to a conveyor arrangement 27. The conveyor arrangement 27 is arranged so as to be rotatable about a first axis of rotation D1. The conveyor arrangement 27 rotates in a direction that is counter to that of the transport wheel 16 and, in accordance with the example, clockwise in a direction of rotation R. The rotational speed of the transport wheel 16 and the rotational speed of the conveyor arrangement 27 are identical and, in the exemplary embodiment, may be up to approximately 210 revolutions per minute.

The conveyor arrangement 27 comprises several and, for example, ten can receptacles 28 that are arranged in uniform distribution over the circumference of the conveyor arrangement 27. For the sake of greater clarity, FIG. 1 only shows a can blank 11 in a few can receptacles 28 as well as in a few transport recesses 18. In FIG. 1, the conveyor arrangement 27 is shown only in a highly schematized manner. The essential components of said conveyor arrangement are shown in the depiction of the detail of the conveyor arrangement 27 in FIG. 2.

Each can receptacle 28 is allocated a holding arrangement 29 for holding and positioning the can blank 11. The holding arrangement 29 contains a plate 30 that can be rotated about a second axis of rotation D2. In the preferred exemplary embodiment, the plate 30 is associated with an intermediate piece 31, whose upper side is adapted to the contour of the can bottom 32, said can bottom having a central arcuate indentation that is concave when viewed from the outside, said indentation coming into engagement with a corresponding projection 33 of the intermediate piece 31. The intermediate piece 31 is interchangeable and is arranged on a base part of the plate 30 depending on the can blanks 11 to be machined.

The plate 30 is non-rotatably arranged on a shaft 37. The shaft 37 is supported coaxially to the second axis of rotation D2 on a carrier 39 via a first bearing arrangement 38. The carrier 39 has two legs 40 that are at a distance from each other in the direction of the second axis of rotation D2, said legs having cutouts along the second axis of rotation D2 and carrying, respectively, one bearing of the first bearing arrangement 38. The shaft 37 extends through the two legs 40. Between the two legs 40, the carrier 39 has a recess 41. In this region, a drive wheel 42 is non-rotatably arranged on the shaft 37.

The inside end region 43 of the carrier 39 is non-rotatably connected with a drive shaft 44 of the conveyor arrangement 27. The drive shaft 44 is arranged coaxially to the first axis of rotation D1. In the exemplary embodiment, the inner end 43 is supported by a flange 45 of the drive shaft 44. At two axially spaced apart points, the drive shaft 44 is supported so as to be rotatable on a not specifically illustrated and merely schematically indicated machine frame 47 with the use of a second bearing arrangement 45 and a third bearing arrangement 46.

As exemplified, a cam rail 51 is arranged below the carrier 43 on the machine frame, whereby, in the exemplary embodiment, said cam rail extends at a constant distance from the first axis of rotation D1 and is closed in the form of a ring. Along its course, the cam rails 51 is divided into several peripheral segments that extend in parallel or diagonal direction to a plane that is oriented at a right angle with respect to the first axis of rotation D1. In the exemplary embodiment, the cam rail 51 has two axially spaced apart sections that extend parallel to the plane and are connected to each other via sections that extend diagonally with respect to said plane.

A cam follower 52 abuts against the cam rail 51. Referring to the exemplary embodiment shown in FIG. 2, the cam follower 52 extends around the cam rail 51 and—viewed in the direction of the first axis of rotation D1—abuts against the cam rail 51 from two opposite sides. In the exemplary embodiment, the cam follower 52 comprises two rollers 53 that abut against the cam rail 51 from the opposite side. The rollers are rotatably mounted to an actuating element 56, said element extending through a hole 57 of the carrier 39 and bearing—on its end opposite the cam follower 52—a holding element 58. In the exemplary embodiment, the actuating element 56 has the form of a rod or bar and essentially extends in the direction of the first axis of rotation D1. Via a guide arrangement 59 that, in the preferred exemplary embodiment, is configured as a roller guide, the actuating element 56 is supported on the carrier 39 so as to be shiftable in the direction of the first axis of rotation D1. Depending on the course of the cam rail 51, the actuating element 56 is positioned or moved in the direction of the first axis of rotation, as a result of which the holding element 58 arranged on the actuating element 56 can also be moved in axial direction between an inoperative position I and a holding position II. FIG. 2 shows the holding position II in dashed lines.

The holding element 58 comprises an interchangeable arcuate or annular support part, said part being configured, as exemplified, as the support ring 60. In the inoperative position I, the support ring 60 encloses the plate 30 and/or the intermediate piece 31. By shifting the actuating element 56 in the direction of the first axis of rotation D1, the support ring 60 can be moved away from the plate 30 in axial direction in order to enclose the side surface 20 of the can blank 11 in a ring-shaped manner and to position or support the can blank 11. The inside diameter of the support ring 60 is greater than the outside diameter of the side surface 20, thus forming an air gap 61 between the side surface 20 and the support ring 60. This air gap 61 is disposed to form an air bearing between the support ring 60 and the can blank 11. To accomplish this, a compressed air supply 62 is provided, so that the compressed air can be conveyed to the support ring 60 and be ejected there radially toward the outside through not illustrated nozzles that are arranged distributed on the periphery. In the exemplary embodiment, the compressed air supply 62 is connected to the actuating element 56. A not illustrated compressed air channel extends in the actuating element 56 and in the holding element 58 in order to supply the support ring 60 and its nozzles, respectively, with compressed air.

The holding arrangement 29 holds the can blank 11 on the plate 30. In the exemplary embodiment described herein, this is accomplished by generating a vacuum in the region of the concave recess of the can bottom 32. For this purpose, a vacuum channel 65 extends through the intermediate piece 31, the plate 30 and the shaft 37 in coaxial direction relative to the second axis of rotation D2. By way of a connecting piece 66 that is connected to the shaft 37, a vacuum pump communicates with the vacuum channel 65 via a vacuum line 67.

The exemplary embodiment as in FIGS. 1 and 2 uses a laser as the cutting element 69 for cutting the can blank 11. A laser source 70 is provided, said laser source generating a laser beam 71 that is guided along an optical path and, in the exemplary embodiment, emitted by the laser source 70 approximately parallel to the first axis of rotation D1. The laser beam 71 is deflected via a deflecting arrangement 72 and directed at the can blank 11 that is to be cut. In doing so, the deflecting arrangement 72 deflects the laser beam 71 so as to be adapted to the rotary motion of the conveyor arrangement 27 about the first axis of rotation D1, so that the focal point F of the laser beam 71 is moved along with the rotary motion of the conveyor arrangement 27 and, consequently, with the rotary motion of the can blank 11, about the first axis of rotation D1. In the exemplary embodiment, the focal point F is located between the two axes of rotation D1, D2 in a plane that comprises the two axes of rotation D1, D2. The distance of the focal point F from the first axis of rotation D1 and the second axis of rotation D2 is constant during the laser cutting of a can blank 11. The laser beam 71 represents the cutting means 69 at the focal point F.

Referring to the arrangement of the device 10, the focal point F is only adapted to the dimensions of can blanks 11 that are to be machined. To accomplish this, the deflecting arrangement 72 can be shifted axially parallel to the first axis of rotation D1, as a result of which the distance of the focusing point F from the plate 30 measured in the direction of the second axis of rotation varies, and thus the distance of the cutting edge from the can bottom 32 can be adjusted. Furthermore, a focusing unit 73 comprising one or more lenses is interposed in the optical path between the laser source 70 and the deflecting arrangement 72 in order to adjust the distance of the focal point F from the first axis of rotation D1 or from the second axis of rotation D2, so that the focal point F is located exactly on the side surface 20 of the can blank 11. The location of the focal point F can be adjusted by axially shifting the deflecting arrangement 72 and the focusing unit 73 relative to each other. To accomplish this, the at least one lens of the focusing unit 73 can be arranged so as to be movable in the direction of the optical path of the laser beam 71. It is also possible to change the diameter of the focal point F via the focusing unit 73.

The deflecting arrangement 72 comprises at least one and, as exemplified, several reflecting surfaces 74. In accordance with the example, the number of reflecting surfaces 74 corresponds to the number of the can receptacles 28 of the conveyor arrangement 27. The reflecting surfaces 74 are arranged so as to be inclined relative to the first axis of rotation D1 and, in the exemplary embodiment, are curved about the first axis of rotation D1 in peripheral direction and, in particular, are configured in a convex, spherical manner. The reflecting surfaces 74 are arranged so as to form a continuous specular surface around the first axis of rotation D1. In this manner, a so-called facet mirror 75 is formed, said mirror having a shape resembling a truncated cone. The side surface of this truncated cone is divided into individual curved facets that form the reflecting surfaces 74. The reflecting surfaces 74 directly adjoin each other to form an edge. The deflecting arrangement 72 and, as exemplified, the facet mirror 75, are coupled so as to move with the conveyor arrangement 27. In the exemplary embodiment, a non-rotatable connection is established between the deflecting arrangement 72 and the conveyor arrangement 27. For this purpose, the facet mirror 75 is non-rotatably connected with the drive shaft 44 and arranged so as to be coaxial with respect to the first axis of rotation D1. Each reflecting surface 74 is associated with a can receptacle 28 and aligned in such a manner that the laser beam 71 is deflected to the associate can receptacle 28 during the cutting operation.

Furthermore, the device 10 comprises a suction unit 80 for evacuating cutting waste and, in particular, the cut off end section 12.

Furthermore, an arcuate drive rail 81 is provided coaxially with respect to the first axis of rotation D1, said drive rail interacting with the drive wheel 42. In doing so, the length of the arc-internal side 82 of the drive rail 81 is defined in such a manner that it is greater than the circumference of the drive wheel 42. When the drive wheel 42 rolls off on the arc-internal side 82 of the drive rail 81 due to the rotation of the conveyor arrangement 27 and the first axis of rotation D1, a rotation of the can blank 11 about its longitudinal axis is achieved via the shaft 37 and the plate 30, said longitudinal axis coinciding with the second axis of rotation D2. Inasmuch as the length of the arc-internal side 82 is greater than the circumference of the drive wheel, the can blank 11 performs more than one complete rotation about its longitudinal axis, so that sufficient time remains to cut the can blank 11 with the use of the laser.

In the exemplary embodiment shown by FIG. 1, a brush part 83 is arranged upstream of the drive rail 81, viewed in the direction of rotation R. The drive wheel 42 is accelerated in a slow and low-wear manner over the soft bristles of the brush part 83 before said brush part comes into abutment with the drive rail 81 and rolls off said drive rail.

The drive rail 81 can be made elastic radially to the first axis of rotation D1 and/or be spring-supported in order to ensure sufficient contact with the drive wheel 42 and, at the same time, ensure a low-wear contact. Alternatively or additionally, the drive wheel 42 may also be made of elastic material.

The device 10 may be arranged suspended or prone. In doing so, the two axes of rotation D1, D2 may be aligned in essentially horizontal direction of in essentially vertical direction.

Figure 3:
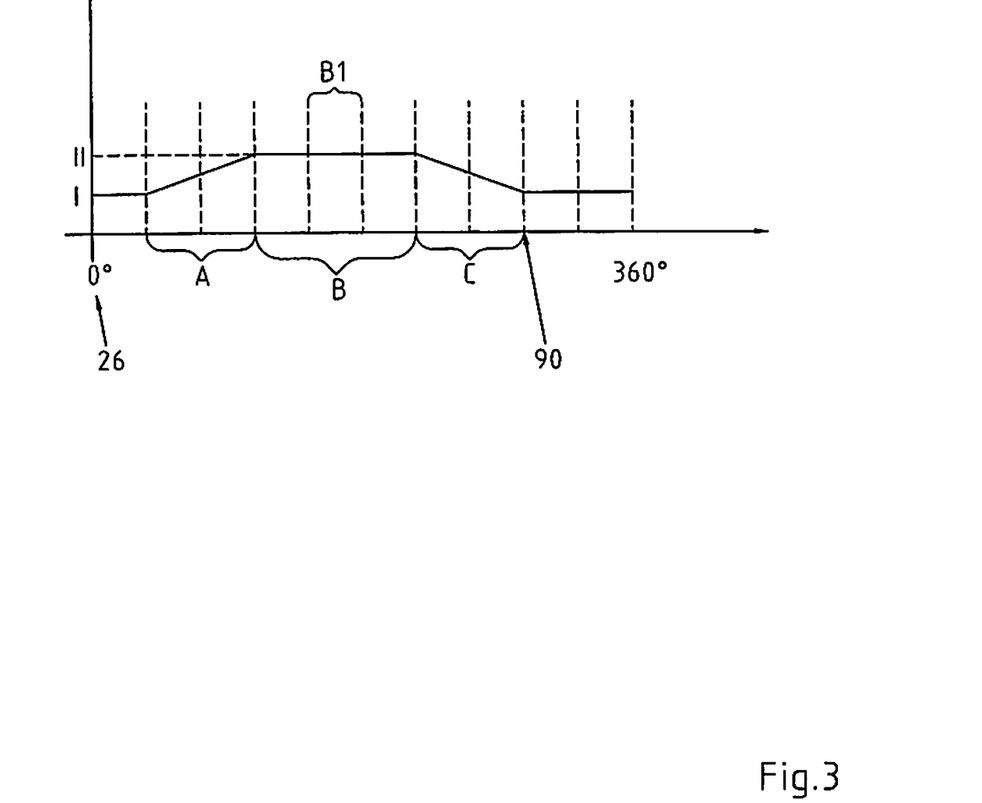
FIG. 3 is a graph that illustrates the reversing of the holding arrangement between two positions I, II as a function of a movement of rotation of a conveyor arrangement about a first axis of rotation D1.

Laser cutting of the can blank 11 is performed as follows:

At the transfer point 26, the can blanks 11 are transferred by the separating arrangement 14 and sequentially inserted in the can receptacle 28 of the conveyor arrangement 27. The conveyor arrangement 27 rotates in the direction of rotation R. As soon as the can blank 11 is arranged on the plate 30 or on the intermediate piece 31, the can blank is held on the plate 30 by the generated vacuum. In a first region of rotation A adjoining the transfer point 26, the holding arrangement 29 and, as exemplified, the holding element 58 comprising the support ring 60 is brought from the inoperative position I into the holding position II. In this first rotational segment A, the cam rail 51 has an ascending slope, as a result of which the actuating element 56 is axially shifted. Adjoining this first rotational segment A, the cam rail 51 again extends parallel to a plane in a second rotational segment B, said plane being oriented at a right angle with respect to the first axis of rotation D1. As a result of this, the holding arrangement 29 remains in its holding position II. FIG. 3 schematically shows the position of the holding arrangement in the regions of rotation.

The drive rail 81 is arranged in this second rotational segment B. The drive wheel 42 is rotated by contact with the arc-internal side 82 of the drive rail 81 and results in a rotation of the can blank 11 about its longitudinal axis or the second axis of rotation D2. In a partial segment B1, the can blank 11 is cut by the cutting means 69, i.e., as exemplified, the laser beam 71. In this partial segment B1, a reflecting surface 74 of the deflecting arrangement 72 moves along the point at which the laser beam 71 impinges on the deflecting arrangement 72 or the facet mirror 75. As a result of this, the incident laser beam 71 is reflected, and the reflected laser beam 71 is directed at the can blank 11 associated with the reflecting surface 74. The focal point F is located on the side surface 20.

As soon as the can body 11 leaves the partial region B1 due to the continued rotation of the conveyor arrangement 27, the laser beam 71 can impinge on the next reflecting surface 74 of the deflecting arrangement 72. As a result of this, the laser beam 71 is directed at the next can blank 11 that is to be cut. The can blanks 11 can thus be cut, without requiring that their movement about the first axis of rotation D1 be delayed or stopped. The can blanks 11 are cut during the continuous and constant rotational movement of the conveyor arrangement 27. Preferably, the laser source 71 is directed onto a can blank 11 only for a duration of time that corresponds to the duration of one rotation of the plate about the second axis of rotation D2. Subsequently, the laser beam 71 is deflected to the next can blank 11.

The cut off remainders and, as exemplified, the severed end section 12 are evacuated by the suction arrangement 80 adjoining the partial region B1. After the can blank has moved through the second rotational segment B, the blank reaches a third rotational segment C, in that the holding arrangement 29 is again moved back from its holding position II into the inoperative position I. To do so, the cam rail 51 has a descending slope, so that the actuating element 56 can be moved in. In its inoperative position I of the holding arrangement 29, the can blank 11 is held only on the plate 30 or on the intermediate piece 31. At a release point 90 the cut can blank 11 is released from the can receptacle 28 into a release channel 91. When the release point 90 is reached, the vacuum for holding the can blank 11 is canceled. A guide surface 92 may be provided at the release point 90, against which the can blank 11 moves due to the rotational movement of the conveyor arrangement 27 and thus is guided out of the can receptacle, before said receptacle continues to rotate to the transfer point 26 and accepts a new can blank 11 there.

Referring to the exemplary embodiment described here, the partial region B1 approximately corresponds to an angular range of 36 degrees. The partial region B1, in which the can blank 11 is being machined, therefore corresponds to 360 degrees divided by the number of can receptacles 28.

Figure 4:
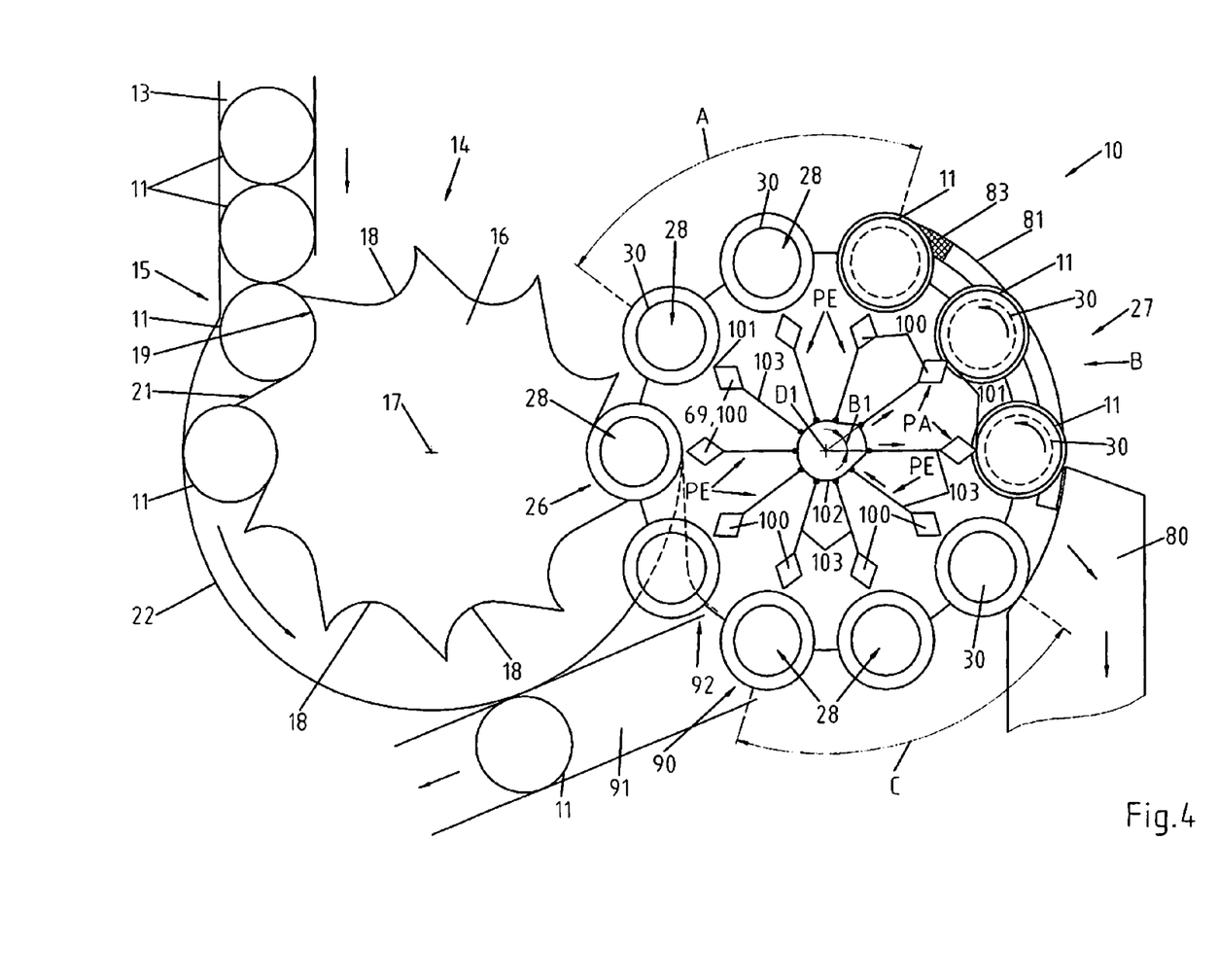
FIG. 4 is an alternative embodiment of the device comprising a mechanical cutting tool instead of a laser.

As is schematically shown by FIG. 4, it is also possible to use a cutting tool 100 with a cutting edge 101 as the cutting means 69 instead of a laser. The cutting edge may consists of polycrystalline diamond (PCD) or of ceramic material. The cutting tool 100 is shiftably supported on the conveyor arrangement 27. Each can receptacle is allocated one separate, shiftable cutting tool.

A control cam 102, for example configured as a rail or a control disk, is used for shifting the cutting tool 100 in the direction toward or away from the associate second axis of rotation D1. The control cam 102 is arranged so as to be non-rotatable relative to the conveyor arrangement 27. Via the cam follower arrangements 103, the cutting tools 100 abut against the control cam 102 for the linear movement of said cutting tools. Due to the extension of the control cam 102, the cutting tools 100 are positioned or shifted, as a function of the rotation of the conveyor arrangement 27, toward the control cam 102. In the moved out position PA, the cutting edge 102 is in contact with the side surface 20 of the can blank 11, whereas, in the retracted position PE, said cutting edge is positioned at a distance from the can blank. As a result of the fact that the cutting tools 100 rotate with the conveyor arrangement 27 about the first axis of rotation D1, this second embodiment also allows that the end section 12 of the can blank 11 can be cut off when said can blank rotates about the first axis of rotation D1 and, at the same time, about its own longitudinal axis.

The embodiment of the device 10 as in FIG. 4 operates like the first embodiment, so that, regarding this, reference can be made to the description regarding the exemplary embodiment as in FIGS. 1 through 3. The difference between the two exemplary embodiments consists in that the second exemplary embodiment uses a mechanical cutting tool 100 instead of a laser source 70 and a deflecting arrangement 72, said mechanical cutting tool being arranged on the conveyor arrangement 27 and rotating with said conveyor arrangement about the first axis of rotation. Other than that, the design of the second embodiment of the device 10 in accordance with FIG. 4 corresponds to the first embodiment in accordance with FIGS. 1 and 2.

The invention relates to a device 10, as well as to a method, for cutting a can blank 11, in which case an axial end section of the can blank 11 is severed. During the cutting operation, the can blank 11 is moved by means of a conveyor arrangement 27 at a constant speed about a first axis of rotation D1. Preferably, a laser beam 71 is used as the cutting means 69. A deflecting arrangement 72, as exemplified by a facet mirror 75 having several reflecting surfaces 74, deflects the laser beam 71 to a focal point F in the region of a can receptacle 28 of the conveyor arrangement 27. The side surface 20 of the can blank 11 is located there. Due the rotation of the can blank 11 about its longitudinal axis D2, the axial end section 12 of said can blank is severed. In doing so, the deflection of the laser beam 71 with the use of the deflecting arrangement 72 is adapted to the rotational motion of the conveyor arrangement 27 about the first axis of rotation D1, so that the focal point F of the laser beam does not change relative to the longitudinal axis of the can blank 11 during the laser cutting operation, even if the can blank rotates about the first axis of rotation D1 that extends at a distance from the longitudinal axis of the can blank 11 and, preferably, parallel to said longitudinal axis.

LIST OF REFERENCE SIGNS

10 Device
11 Can blank
12 End section of the can blank
13 Supply channel
14 Separating arrangement
15 Receiving location
16 Transport wheel
17 Transport wheel axis of rotation of
18 Transport wheel recess
19 First recess section
20 Side surface
21 Second recess section
22 Guide element
26 Transfer point
27 Conveyor arrangement
28 Can receptacle
29 Holding arrangement
30 Plate
31 Intermediate piece
32 Can bottom
33 Projection
34 Base part of the plate
37 Shaft
38 First bearing arrangement
39 Carrier
40 Leg
41 Recess
42 Drive wheel
43 Inside end of support
44 Drive shaft
45 Second bearing arrangement
46 Third bearing arrangement
47 Machine frame
51 Cam rail
52 Cam follower
53 Roller
56 Actuating element
57 Hole
58 Support part
59 Guide arrangement
60 Support ring
61 Air gap
62 Compressed air supply
65 Vacuum pressure channel
66 Connecting piece
67 Vacuum line
69 Cutting element
70 Laser source
71 Laser beam
72 Deflecting arrangement
73 Focusing unit
74 Reflecting surface
75 Facet mirror
80 Suction unit
81 Drive rail 82 Arc-internal side
83 Brush part
90 Release point
91 Release channel
92 Guide surface
100 Cutting tool
101 Cutting edge
102 Control cam
103 Cam follower arrangement
A First rotational segment
B second rotational segment
B1 Partial segment
C Third rotational segment
D1 First axis of rotation
D2 Second axis of rotation
F Focal point
PA Moved-out position
PE Moved-in position
R Direction of rotation
I Inoperative position
II Holding position The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. Device (10) for cutting a can blank (11), comprising:
   a conveyor arrangement (27) comprising several can receptacles (28) for accommodating respectively one can blank (11), said conveyor arrangement rotating about a first axis of rotation (D1),
   wherein each can receptacle (28) is allocated a holding arrangement (29) comprising a plate (30), said plate rotatable about a second axis of rotation (D2),
   a cutting means (69) that, adapted to the rotation of the conveyor arrangement (27) about a first axis of rotation (D1), also rotates about the first axis of rotation (D1),
   the holding arrangement (29) further comprises a holding element (58), said holding element being movable between an inoperative position (I) and a holding position (II),
   in its holding position (II), the holding element (58) supports the can blank (11) on its side surface (20), and,
   the holding element (58) is supported so that it can be guided in a shifting manner parallel to the second axis of rotation (D2).

2. Device as in claim 1, characterized in that a cutting tool (100) having a cutting edge (101) is used as the cutting means (69), said cutting tool rotating together with the conveyor arrangement (27) about the first axis of rotation (D1).

3. Device as in claim 2, characterized in that each can receptacle (28) is allocated a cutting tool (100).

4. Device as in claim 3, characterized in that the cutting tool (100) is supported by the conveyor arrangement (27) so that said cutting tool can be moved radially or aslope relative to the second axis of rotation (D2).

5. Device as in claim 1, characterized in that, the cutting means (69) comprises a laser beam (71), a laser source (70) configured to produce the laser beam (71), said laser source being stationary relative to the conveyor arrangement (27), and a deflecting arrangement (72), said deflecting arrangement deflecting the laser beam (71) of the laser source (70) adapted to the rotation of the conveyor arrangement (27), are provided, whereby the deflected laser beam (71) is disposed to act as the cutting means in the region of its focal point (F).

6. Device as in claim 5, characterized in that the deflecting arrangement (72) is supported so as to be shiftable parallel to the second axis of rotation (D2).

7. Device as in claim 5, characterized in that the deflecting arrangement (72) comprises at least one reflecting surface (74), said reflecting surface moving adapted to, or together with, the conveyor arrangement (27).

8. Device as in claim 7, characterized in that the number of reflecting surfaces (74) of the deflecting arrangement (72) corresponds to the number of the can receptacles (28).

9. Device as in claim 1, characterized in that the holding element (58) comprises an arcuate or annular support part (60), said support part enclosing the side surface (20) of the can blank (11) at a distance from the can bottom (32).

10. Device as in claim 9, characterized in that the support part (60) has an air bearing (61) on its inside.

11. Device as in claim 1, characterized in that shifting of the holding element (58) between the inoperative position (I) and the holding position (II) is accomplished by a cam rail (51), whereby a cam follower (52) connected to the holding element (58) abuts against said cam rail.

12. Device as in claim 1, characterized in that the plate (30) is non-rotatably connected to a drive wheel (42).

13. Device as in claim 12, characterized in that an arcuate drive rail (81) is arranged coaxially to the first axis of rotation (D1), whereby the drive wheel (42), in a first segment of the rotation of the conveyor arrangement (27) about the first axis of rotation (D1), abuts against the drive rail.

14. Method for cutting a can blank (11) with the device (10) of claim 5, comprising the following steps:
   supplying several can blanks (11) to respectively each of the can receptacles (28) of the conveyor arrangement (27) rotating about the first axis of rotation (D1);
   activating the laser source (70) and deflecting the laser beam (71), adapted to a rotational movement (R) of the can blank (11) about the first axis of rotation (D1), by means of the deflecting arrangement (72); and
   rotating the can blank (11) about its longitudinal axis (D2) during the laser cutting operation.

* * * * *